United States Patent [19]
Fletcher et al.
[11] 3,828,138
[45] Aug. 6, 1974

[54] COHERENT RECEIVER EMPLOYING NONLINEAR COHERENCE DETECTION FOR CARRIER TRACKING

[76] Inventors: James C. Fletcher, Administrator of the National Aeronautics and Space Administration with respect to an invention by; William C. Lindsey, Pasadena; Marvin K. Simon, La Canada, both of Calif.

[22] Filed: May 10, 1973

[21] Appl. No.: 359,039

[52] U.S. Cl. .............................. 179/15 BC, 325/346
[51] Int. Cl. .............................................. H04b 1/06
[58] Field of Search ......... 179/15 BC; 325/346, 476

[56] References Cited

UNITED STATES PATENTS

| | | | |
|---|---|---|---|
| 3,435,343 | 3/1969 | Pierret | 325/476 |
| 3,742,361 | 6/1973 | Wason | 325/476 |
| 3,754,101 | 8/1973 | Daspit | 179/15 BC |
| 3,763,492 | 10/1973 | Easton | 325/346 |
| 3,769,602 | 10/1973 | Griswold | 325/346 |

*Primary Examiner*—Ralph D. Blakeslee
*Attorney, Agent, or Firm*—Monte F. Mott; John R. Manning; Paul F. McCaul

[57] ABSTRACT

The concept of nonlinear coherence employed in carrier tracking to improve telecommunications efficiency is disclosed. A generic tracking loop for a coherent receiver is shown having seven principle feedback signals which may be selectively added and applied to a voltage controlled oscillator to produce a reference signal that is phase coherent with a received carrier. An eighth feedback signal whose nonrandom components are coherent with the phase detected and filtered carrier may also be added to exploit the sideband power of the received signal. A ninth feedback signal whose nonrandom components are also coherent with the quadrature phase detected and filtered carrier could be additionally or alternatively included in the composite feedback signal to the voltage controlled oscillator.

4 Claims, 6 Drawing Figures

COHERENT RECEIVER EMPLOYING NONLINEAR COHERENCE DETECTION FOR CARRIER TRACKING

ORIGIN OF THE INVENTION

The invention described herein was made in the performance of work under a NASA contract and is subject to the provisions of Section 305 of the National Aeronautics and Space Act of 1958 Public Law 85-568 (72 Stat. 435; 42 USC 2457).

BACKGROUND OF THE INVENTION

This invention relates to coherent receivers and employs the concept of the nonlinear coherence of random nonlinear oscillations, and more particularly to receivers in which nonlinear coherence is employed to increase telecommunication efficiency.

The meaning of the term "nonlinear coherence" can be explained as follows. The usual method for examining the mutual power between two signals $s_1(t)$ and $s_2(t)$ at an arbitrary frequency $f$ is through the use of the so-called cross-spectrum. In essence, the cross-spectrum of two signals will represent the spectral density of power that is mutually shared in a phase coherent manner. It is important to note that each signal can have power in the same frequency band without there being cross-spectral power in that band. Thus, having common frequency components does not guarantee mutually coherent power. On the other, in order to have mutually coherent power, the signals must be phase coherent.

In a nonlinear system, it is possible to have coherency between a signal at one frequency, say $f_1$, and another signal at some multiple of that frequency. For example, in a squaring loop which is commonly used for tracking suppressed carrier signals, such an input signal with energy centered around $f_1$ is squared (nonlinear operation) to produce a signal centered around $2f_1$ which is phase coherent with the suppressed carrier signal. The signal at $2f_1$ is then tracked by a conventional phase-locked loop with a VCO whose nominal frequency is $2f_1$.

Mathematically speaking, consider the nonlinear cross-spectrum $$S_{12}(f;\, m, n) \stackrel{\Delta}{=} \iint_{-\infty}^{\infty} s_1^m(t) s_2^n(t+\tau) \exp\,(-i2\pi f\tau)\, dt\, d\tau \tag{1}$$

where $m$ and $n$ are integers. To test for the possibility that $s_2(t)$ has a frequency component coherent, in a nonlinear manner, with a component in $s_1(t)$ at twice the frequency, one would compute $$S_{12}(f;\, 2, 1) = \iint_{-\infty}^{\infty} s_1^2(t) s_2(t+\tau) \exp\,(-2\pi i f\tau)\, dt\, d\tau \tag{2}$$

In terms of the squaring loop, $s_1(t)$ would be the biphase modulated (suppressed) carrier input signal and $s_2(t)$ the phase-locked loop reference signal at $2f_1$, i.e., $$s_1(t) = d(t) \sin\,(2\pi f_1 t)$$
$$s_2(t) = \cos\,[2\pi(2f_1)t] \tag{3}$$

If for the moment we ignore the modulation $d(t)$ on $s_1(t)$, then $S_{12}(f;2,1)$ would have a spectral line at $2f_1$. Thus, the signals $s_1(t)$ and $s_2(t)$ are said to be nonlinearly coherent and the coherent receiver structure of the present invention is conjectured on this principle.

As satellite and deep space technology have advanced rapidly, even in the few years of its history, topics of increasing current interest are the application of Earth Satellites to the development of tracking and data-relay satellite networks for relaying earth resource data, earth-orbiting manned space/base stations, tactical communications satellite systems, integrated communications-navigation networks, air traffic control systems, etc. Outside the application of satellites in orbit about the Earth, interest centers around the placing of communication satellites in orbit about Mars, and the sending of exploratory spacecraft to Jupiter, Neptune, Saturn and Pluto. While such applications impose autonomous operation of long periods of service on both man and machine, they also place increased demands on telecommunication system efficiency. Telecommunication system efficiency means the effectiveness with which a system performs both the tracking and the communication functions. In what follows we develop the theory as it applies to the various areas of carrier and suppressed carrier tracking, subcarrier tracking and phase-coherent communications.

SUMMARY OF THE INVENTION

In a receiver channel for a time varying signal $x$ characterized by $x = \sqrt{2P_c} \sin \Phi + \sqrt{2S} \times \cos\Phi + n_i$ where $x = \mathcal{S}d$ is a biphase modulated subcarrier, $\mathcal{S}$ and $d$ represent the data subcarrier and the data waveforms, respectively, which are assumed to be square waveforms, and where $\Phi = \omega_o t+\theta$, $\theta$ characterizes modulation due to receiver motion or the randomness of the channel, $P_c=m^2P$ represents power at the carrier frequency, $S = (1-m^2)P$ represents the power remaining in the modulation sidebands and $m$ denotes the modulation, and where $\hat{\mathcal{S}}$ and $\hat{d}$ represent the receiver's estimates of the data subcarrier and the data waveforms, respectively, a generic tracking loop, provided to exploit the principle of nonlinear coherence is comprised of: a voltage controlled oscillator for generating a time varying reference signal $r_u = \sqrt{2}\, K_1 \cos \hat{\Phi}$; a summing junction and a smoothing filter coupling the junction to a control terminal of the oscillator; a 90° phase-shift network for providing a quadrature phase reference signal $r_l = \sqrt{2}\, K_2 \sin \hat{\Phi}$ where $\hat{\Phi}$ is the time varying loop estimate of $\Phi$; two multipliers responsive to the receiver signal and the signals $r_u$ and $r_l$ for producing quadrature phase error signals $\epsilon_u = xr_u$ and $\epsilon_l = xr_l$; a first low-pass filter of a particular bandwidth and gain coupling the signal $r_u$ to a point ② connected to the summing junction; a first multiplier having one terminal connected to receive the output of the first filter and the output of a second low-pass filter of a particular bandwidth and gain to provide a product signal at a point ① connected to the summing junction; means for demodulating the phase error signal $\epsilon_u$ by a phase estimate of a reference square-wave subcarrier and a third low-pass filter of a particular bandwidth and gain for filtering the demodulated signal; means for delaying this subcarrier demodulated and filter signal a time T equal to a data symbol period; means for multiplying this first delayed signal by $\hat{d}(t-T)$ where $\hat{d}(t)$ is the time varying estimate of the data waveform; means for multiplying the output of this last multiplying means by the output of the first filter to produce a third feedback signal at point ③ connected to the summing junction; means for demodulating the phase error signal $\epsilon_l$ by a phase quadrature estimate of the reference squarewave subcarrier and a fourth low-pass filter of a particular bandwidth and gain for filtering the phase quadrature demodulated signal; means for delaying this subcarrier phase quadrature demodulated and filtered signal the period T; means for multiplying this second delayed signal by $\hat{d}(t-T)$ to produce another signal at a point ⑥ connected to the summing junction; means for multiplying the output of this last multiplying means by the product of the multiplying means of the first delayed signal and $\hat{d}(t-T)$ to produce yet another signal at a point ⑤ connected to the summing junction; means for multiplying the output of the second low-pass filter and the output of the penultimate multiplying means to produce a signal at a point ⑦ connected to the summing means; fifth and sixth low-pass filters of particular bandwidth and gain connected to the outputs of respective third and fourth filters; and a multiplier having its output terminal connected to a point ④, one input terminal connected to the output of the sixth filter and another input terminal connected to the output of the fifth filter by an operator which provides a function approximately equal to tanh $x$, where $x$ is the output of the fifth filter. The gain of these filters may be selectively set to zero to effectively remove signals at points ① through ⑦ to provide a desired combination of feedback signals to the summing junction, as for an adaptive filter, or to optimize tracking for a particular application with minimum hardware, in which case circuitry associated with only disconnected feedback signals may be omitted.

To exploit sideband power in applications where phase error can be assumed to be constant over several data symbol intervals, additional feedback signal at points ⑧ and ⑨ may be provided by a delay means of a period T coupling the receiver input signal $x$ to two multipliers receiving the reference signals $r_u$ and $r_l$, separately for phase detection of the delayed input signal, and separate low-pass filters of particular bandwidth and gain coupling the outputs of the multipliers to the points ⑧ and ⑨. The filtered output of the inphase error signal thus produced at point ⑧ is connected to the summing junction, and the filtered output of the quadrature phase error signal thus produced at point ⑨ is connected to the output of the second filter for addition to the corresponding quadrature phase error signal filtered through the second filter. The nonrandom components of these signals at points ⑧ and ⑨ are coherent with the corresponding signals at the outputs of the first and second filters, but their noise components are orthogonal in time with those corresponding signals. As in the case of feedback signals at points ① through ⑦, the feedback signals at points ⑧ and ⑨ may be selectively removed, either actually or effectively by reducing their filter gain to zero. However, the feedback signal at point ⑧ is advantageously connected only when the feedback signal at point ② is connected and the same is true for points ③ and ⑨.

The feedback signals at points ① through ⑦ may be advantageously provided in all possible combinations taken 1, 2, 2, 4, 5, 6 and 7 at a time, and the feedback signals at points ⑧ and ⑨ may be added to these combinations to form additional combinations with the limitations expressed or implied with respect to these last feedback signals. All combinations are new except ①, ②, and ⑥ individually, the combination of signals at points ② and ⑥ only, and the combination of signals at points ② and ④ for low signal-to-noise ratio where the operator provides the function tanh $x \approx x$, $x << 1$, for low signal-to-noise ratios. For high signal-to-noise ratios, tanh $x \approx$ sgn $x$, $x >> 1$, to provide a new combination of just the signals at points ② and ④.

DESCRIPTION OF THE PREFERRED EMBODIMENTS

Figure 1:
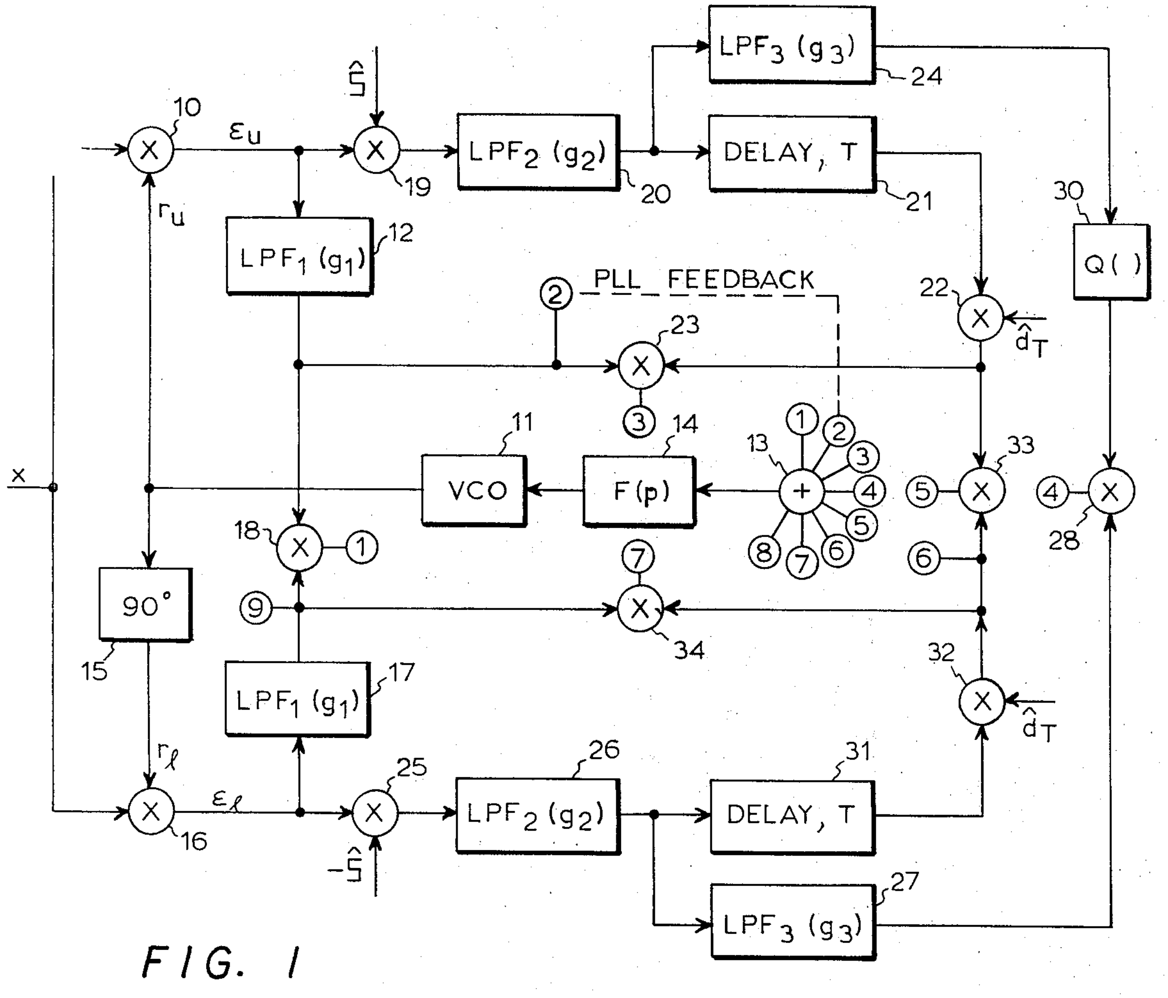
FIG. 1 is a schematic diagram of a generic tracking loop according to the present invention.

A generic tracking loop for a coherent receiver which fully exploits the principle of non-linear coherence is shown in FIG. 1. The receiver is novel in that it suggests adding one or more levels of technology to that which exists in present-day tracking and communication receivers. It also provides for the planning of future tracking and coherent communication systems. Many special cases of the general structure exist.

This receiver is concerned with only a single channel system where the random oscillations of the received signal can be characterized by $$x(t) = \sqrt{2P} \sin [\omega_0 t + (\cos^{-1} m) X(t) + \theta(t)] + n_i(t) \quad (4)$$

where $X(t) = d(t)S(t)$ is a bi-phase modulated data subcarrier, $\theta(t)$ characterizes the modulation due to vehicle motion or the randomness of the channel, and $n_i(t)$ is a narrowband, "white" Gaussian noise process of double-sided bandwidth $W_i$ Hz and single-sided spectral density $N_0$ watts/Hz, i.e.

$$n_i(t) = \sqrt{2} \, [n_c(t) \cos(\omega_0 t + \theta(t)) - n_s(t) \sin(\omega_0 t + \theta(t))] \quad 5.$$

The noise components $n_c(t)$ and $n_s(t)$ are independent "white" Gaussian processes with single-sided spectral density $N_0$ watts/Hz. Also in Equation (4), the parameter $\cos^{-1} m$ represents the system modulation index and $m$ denotes the modulation factor. The generalization of that which follows to N channel systems is straightforward in view of that already presented in W. C. Lindsey, "Determination of Modulation Indexes and Design of Two-Channel Coherent Communication Systems", IEEE Transactions on Communication Technology, Vol. Com-15, pp. 229–237, April, 1967, and W. C. Lindsey, "Design of BlockCoded Communications Systems", IEEE Transactions on Communication Technology, Vol. Com–15, No. 4, pp. 524–534, August, 1967.

The data subcarrier $\mathfrak{S}(t)$ is assumed to be a square wave, i.e., a sequence of ±1's occurring at the subcarrier rate and the data sequence $d(t)$ is also characterized by a sequence of ±1's occurring at the symbol rate. Extension to the case of sinusoidal subcarriers follows the approach taken in the last reference cited, supra. Assume that the ±1's in the data sequence occur with equal probability and have a duration of T seconds. Under these assumptions Equation (4) can be rewritten as $$x = \sqrt{2P_c}\sin\Phi + \sqrt{2S}\times\cos\Phi + n_i$$
$$\Phi = \omega_0 t + \theta \qquad 6.$$

where $P_c = m^2P$ represents the power which remains at the carrier frequency and $S = (1-m^2)P$ represents the power remaining in the modulation sidebands. If $m = 0$, we have complete suppression of the carrier and if $m = 1$ we have no power in the modulation sidebands. In Equation (6), note that the time variable has been suppressed by letting $x(t) = x$, $\theta(t) = \theta$, $X(t) = X$, $\phi(t) = \phi$, etc. This will be convenient throughout for discussion, and in the drawings, although in practice it is evident that the signals are time varying.

In FIG. 1, $\hat{\mathfrak{S}}$ and $\hat{d}$ respectively represent the local receiver's estimates of the data subcarrier and the data waveforms. The received signal $x$ is applied to a multiplier (detector) 10, such as a double balanced diode mixer, having its second input connected to a voltage controlled oscillator (VCO) 11. The output of the detector is connected to a low-pass filter 12 designated $LPF_1$ with a gain $g_1$ to indicate a low-pass filter of a particular bandwidth and gain. The output of filter 12 is, or may be, connected to a summing junction 13 through points ② as indicated by a dotted line. Each of the connecting points to the summing junction represented by a small circle at the end of a line is or may also be connected to another point in the circuit represented by a small circle and having the same number in the circle, as shown for the connection of points ② which provides conventional phase-locked loop (PLL) feedback to the VCO through a smoothing filter 14. To this basic PLL, additional elements are added as shown using filters of designated d-c gain ($g_n$), where the gain may be zero, i.e., where the filter may be an open circuit and the circuit between the filter of zero gain and the summing junction may be omitted.

A 90° phase shifter 15 couples the output of the VCO to a multiplier (detector) 16 to produce a phase error signal $\epsilon_l$ in phase quadrature with the phase error signal $\epsilon_l$ out of the detector 10. When passed through a low-pass filter 17 of the same particular bandwidth and gain as the filter 12, a feedback signal is produced which, when multiplied with the output of the LPF 12 in a multiplier 18 and fed back to the VCO through the summing junction, provides a special case of what may be referred to as an N-Phase Costas (I-Q) Loop, where $N$=2. See "Carrier Synchronization and Detection of Polyphase Signals", IEEE Trans., Vol. Com-20, No. 3, June, 1972, pp. 441–454 at pages 447 and 448.

The phase error signal $\epsilon_u$ is demodulated by a phase estimate of the reference squarewave subcarrier through a multiplier (detector) 19 and filtered through a low-pass filter 20 designated $LPF_2$ of a particular bandwidth and gain, $g_2$. The filtered signal is then transmitted through a T-second delay element 21 and multiplied by $\hat{d}_T \triangleq \hat{d}(t-T)$ in a multiplier (detector) 22. As will be described more fully hereinafter, this assumes the phase error is constant during the symbol time T, i.e., $\phi(t) = \phi(t-T)$. When multiplied by the PLL feedback signal at point ② through a multiplier (detector) 23, a feedback signal to the VCO is produced at point ③ and added to other feedback signals.

If the output of the filter 20 is further filtered by a filter 24 designated $LPF_3$ of gain $g_3$ and multiplied by a phase quadrature signal developed similarly through elements 24, 25, 26 and 27 in a multiplier (detector) 28, a fourth feedback signal is produced at point ④ and added to other feedback signals. An operator Q( ) is introduced by an element which as described with reference to Equation (7), infra., which for high signal-to-noise ratios (high SNR's) is sgn(x). For low signal-to-noise ratios (low SNR's) the output of operator Q( ) is simply $x$, where $x$ represents the signal at the output of the filter 24, and not the input signal to the tracking loop.

A fifth feedback signal at point ⑤ is produced by multiplying in a multiplier (detector) 33 the output of the multiplier 22 by a phase quadrature signal similarly developed through elements 31 and 32. The phase quadrature signal developed in that manner at point ⑥ is added to other feedback signals, and multiplied with the output of filter 17 in a multiplier (detector) 34. The product at point ⑦ is added to other feedback signals.

In the circuit just described, the operator Q( ), linear or nonlinear, is inserted for the sake of generality. In practice, it is determined by the design engineer whose choice is influenced by the theory of continuous nonlinear filtering. Based upon the method of estimation described by S. Butman and M. K. Simon, "On the Receiver Structure for a Single-Channel Phase-Coherent Communication System," JPL Space Programs Summary, Vol. III; No. 37–62, pp. 103–108, and J. J. Stiffler, "A Comparison of Several Methods of Subcarrier Tracking," JPL Space Programs Summary, Vol. IV., No. 37—37, pp. 268–275, one might set $Q(x) = \tanh(x)$, although from the point of view of continuous nonlinear filtering theory this choice is a suboptimum one. Nevertheless, if such an operation were to be inserted in the system, one would probably wish to implement it only in one of two forms depending on the data signal-to-noise ratio. Since $$\tanh x \approx \begin{cases} \operatorname{sgn} x & x>>1 \\ x & x<<1 \end{cases} \qquad (7)$$

one would remove this nonlinearity for low data signal-to-noise ratios and for high signal-to-noise ratios in the data stream, one would mechanize it by a hard limiter characteristic. The details which motivate such a nonlinear structure will be elaborated on in what follows.

The oscillations $r_u$ appearing at the input to the upper phase detector 10 are characterized by $$r_u(t) = \sqrt{c\,2}\,K_1\cos\hat{\Phi}(t) \qquad 8.$$

while the oscillations $r_l$ appearing at the input to the lower phase detector 16 are characterized by $$r_l(t) = \sqrt{2}\,K_2\sin\hat{\Phi}(t) \qquad 9.$$

where $\hat{\Phi}$ is the loop estimate of $\Phi$. Before proceeding with the derivation of the stochastic integro-differential equation of operation for the multiple loop configuration of FIG. 1, one additional concept will be briefly introduced because it can easily be carried along in the analysis which follows.

Figure 2:
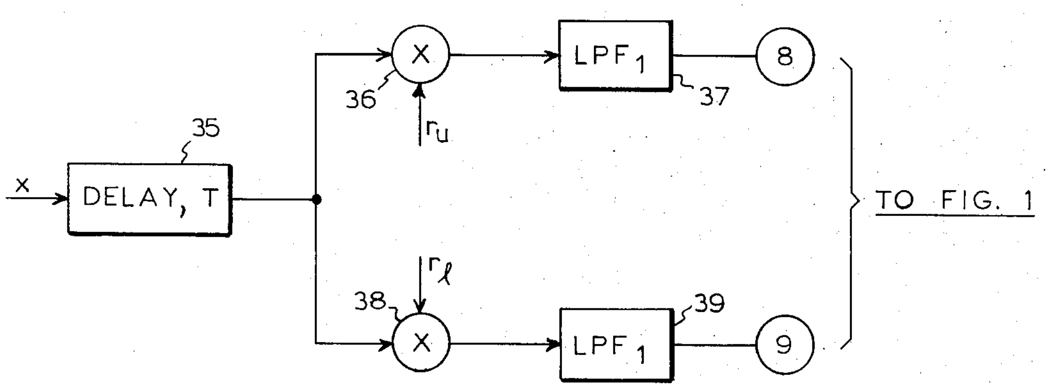
FIG. 2 is an addendum to the circuit to be added in particular cases to the generic tracking loop of FIG. 1.

For a great many applications (e.g., medium to high rate telemetry) the phase error $\phi = \theta - \hat{\theta}$ can be assumed to be constant over several symbol intervals; hence, delay elements such as those in FIG. 1 can be used to exploit the sideband power in much the same manner as is done in differentially coherent detection or time diversity reception. An example of how this might be done is illustrated in FIG. 2 using elements 35 through 39 where the phase error is assumed to be constant for T seconds and the correlation time of the additive noise is much less than T. Elements 36 and 38 correspond to respective elements 10 and 16 of FIG. 1, but are in addition to and are connected to receive independently the reference signals $r_u$ and $r_l$. The input signal $x$ is applied directly to the delay element 35 in addition to the elements 10 and 16 of FIG. 1. In effect, two signals are produced at points⑧and⑨whose nonrandom components are coherent with, but whose noise components are orthogonal in time with, the corresponding signal components at the outputs of the two filters 12 and 17 in FIG. 1. Thus, for example, one might add the signal at point⑧into the multiple summing junction 13 and/or add the signal at point⑨to the output of filter 17 before further processing in the loop. In practice, both would normally be included together, or both omitted. However, the signal at point⑧is advantageously connected to the summing junction only if the signal at point②is connected. In the ideal case, including them would improve the signal-to-noise ratio at each of these points⑧and⑨by 3 db.

A mathematical description of the signals at points① -⑨will now be presented, in each case indicating which are individually similar to present day telecommunication system designs, and which are novel. Collectively, in all possible combinations, except just the signals at points①,②,④, and⑥individually, and the combination of points②and⑥, and the combination of points②and④for low signal-to-noise ratios, they are all novel. A stochastic integro-differential Equation (26), infra., governs the operation of a loop which uses all of these signals as sources of coherent energy for improvement of telecommuniation efficiency. A loop which uses all feedback signals might not necessarily yield the best performance for all applications. Only after a given application is analyzed will one be able to specify which or what combination of the signals①-⑨ should be used. The generic tracking loop described with reference to FIGS. 1 and 2 provides for the most general system based upon the principle of nonlinear coherence. Some examples will be given which are special cases of the general system. However, it should be understood that the present invention is not limited to those examples. In this sense, the paper should be looked upon as presenting some new ideas but not answering all questions relative to their application. One skilled in the field of communication system theory and well acquainted with the published literature on the subject should not find difficulty in applying the generic tracking loop to suit his particular needs by effectively selecting a gain of zero for some filters by omitting them together with signal components that follow. One may even find it advantageous to include all filters and the signal components that follow in order to provide for switching the gain of some filters to zero under certain conditions, i.e., to provide for mechanization of an adaptive tracking loop in a coherent receiver.

How the concept of coherence of random nonlinear oscillations can be exploited to the advantage of the telecommunication engineer by this invention will now be presented. We begin by presenting the equations which represent the random voltages appearing at points one①through seven⑦in FIG. 1.

Neglecting double frequency terms, the output of the upper phase-detector 10 is given by $$\epsilon_u = K_1 [\ \sqrt{P_c} \sin\phi + \ \sqrt{S} \times \cos\Phi + n_u(t,\phi)] \quad 10.$$

while the output of the lower phase-detector 16 is $$\epsilon_l = K_2 [\ \sqrt{P_c} \cos\phi - \ \sqrt{S} \times \sin\phi - n_l(t,\phi) \quad 11.$$

where $$n_u(t,\phi) = n_c(t) \cos \phi - n_s(t) \sin \phi$$
$$n_l(t,\phi) = n_c(t) \sin \phi - n_s(t) \cos \phi \quad 12.$$

and all multipliers are assumed to have a gain of unity. Clearly, $n_u(t,\phi)$ and $n_l(t,\phi)$ are uncorrelated. Furthermore, if the loop bandwidth is narrow relative to $W_i$, then they can be approximated by statistically independent low pass "white" Gaussian noise processes of single-sided spectral density $N_0$ watts/Hz. Assuming that the low-pass filters 12 and 17 do not pass the modulated data subcarrier components, then the random nonlinear oscillations appearing at point①are given by $$S_{①}=g_1^2\left\{\frac{K_1K_2P_c \sin 2\phi}{2} + \sqrt{P_c}[K_2 \cos \phi n_{u1} - K_1 \sin \phi n_{l1}] - n_{u1}n_{l1}\right\} \quad (13)$$

where $n_{u1}$ and $n_{l1}$ are respectively the noise processes which emerge from the filters 12 and 17, and $g_1$ is the d-c gain of these filters. These processes are approximately independent, low-pass band-limited and have spectra determined by the passage of "white" noise through the normalized filters, i.e., $$S_{n_{u1}}(\omega) = S_{n_{l1}}(\omega) = N_0 |G_1(\omega)/G_1(3220)|^2/2$$

where $G_1(\omega)$ is the transfer function of the filters. Also note that $g_1 = G_1(0)$.

Neglecting double frequency terms the signal at point two,②, is given by $$S_{②} = g_1 K_1 [\ \sqrt{P_c} \sin\phi + n_{ul}] \quad (14)$$

This signal represents the dynamic phase error in conventional PLL tracking receivers.

Referring now to the signal which appears at point three③of the loop, assume for the moment that the reference squarewave subcarrier $\sqcap$ is perfect, i.e., $\hat{\sqcap}=\sqcap$. This is not too restrictive since this is largely true in any efficient coherent receiver. Since the output of the upper low-pass filter 20 of d-c gain $g_2$, can be represented by $g_2K_1[d\ \sqrt{S}\cos\hat{\phi}+n_{u2}]$, then the delayed version when multiplied by $\hat{d}_T$ and the signal at point②produces $$S_{③}=g_1g_2K_1^2\left[d_T\hat{d}_T\sqrt{SP_c}\frac{\sin 2\phi}{2}+\sqrt{P_c}\hat{d}_T \sin \phi n_{u2T} + \sqrt{S}d_T\hat{d}_T \cos \phi n_{u1}+\hat{d}_T n_{u1}n_{u2T}\right] \quad (15)$$

where we have assumed that the phase error is constant during the symbol time, i.e., $\phi(t-) = \phi(t-T)$ and as previously mentioned the T subscript denotes a T second delay version of the corresponding signal, e.g., $\hat{d}_T$ $\triangleq \hat{d}(t-T)$. In applications where this is not the case $S_{\textcircled{3}}$ does not hold since $\phi(t) \neq \phi(t-T)$. The spectral density of the low-pass approximately Gaussian noise process $n_{u2}$ is given by $S_{n_{u2}}(\omega) = N_0|G_2(\omega)/G_2(0)|^2/2$ where $G_2(\omega)$ is the transfer function of the filter 20. Also, $N_{u2}$ is approximately independent of $n_{u1}$ and $n_{l1}$ since its energy comes from a narrow-band region of $n_u$ centered around the subcarrier frequency.

When the phase-error is constant for several symbol intervals, then $d_T\hat{d}_T$ can be replaced by its statistical average $E(d_T\hat{d}_T) = 1 - 2P_E(\phi)$ and Equation (15) reduces to $$S_{\textcircled{3}} = g_1 g_2 K_1^2 \left[ \sqrt{SP_c}(1-2P_E(\phi)) \frac{\sin 2\phi}{2} + \sqrt{P_c}\hat{d}_T \sin\phi\, n_{u2T} + \sqrt{S}(1-2P_E(\phi)) \cos\phi\, n_{u1} + \hat{d}_T n_{u1} n_{u2T} \right] \quad (16)$$

Figure 3:
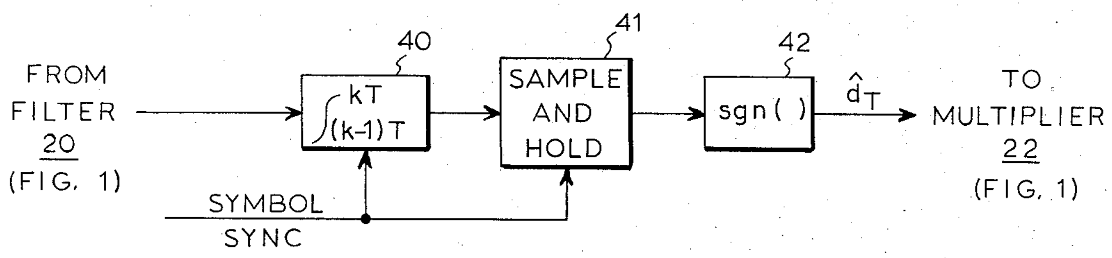
FIG. 3 is a schematic diagram for an arrangement to be used to develop the signal $\hat{d}(t-T)$ in FIG. 1 for particular cases.

Assume that $\hat{d}$ is obtained by a matched filter technique as in FIG. 3, where an integrator 40 is followed by a sample and hold circuit 41 to hold the output of the integrator at the end of an interval T until the next interval, where the interval is established by a symbol synchronizing signal of the receiver employing the present invention. A hard limiter 42 follows the sample and hold circuit to yield the signal $\hat{d}(t-T)$. The integrator is reset at the end of each time interval T. Then, for the special case of phase-shift keyed signals, the function $P_E(\phi)$ is the conditional symbol error probability given by $$P_E(\phi) = \frac{1}{\sqrt{2\pi}} \int_{\sqrt{2R}\cos\phi}^{\infty} \exp(-x^2/2)dx \quad (17)$$

where $R = ST/N_0$.

The signal appearing at point four④will be characterized for two conditions, viz., for high and for low signal-to-noise ratios. We assume, without loss in generality, that $Q(x) = \tanh x$. For high data stream signal-to-noise ratios $\tanh x \approx \mathrm{sgn}\, x$ and $$S_{\textcircled{4}} = g_2 g_3 K_2 [\sqrt{S}\hat{d} d \sin\phi + \hat{d} n_{l3}] \quad (18).$$

where $\hat{d}$ represents the data stream "estimate" produced by the upper filter 20 in cascade with sgn $x$, and $g_3$ is the d-c gain of the filters 24 and 27. The noise process $n_{l3}$ is approximately low-pass Gaussian and has a spectral density $S_{n_{l3}} = N_0|G_2(\omega)G_3(\omega)/G_2(0)G_3(0)|^2/2$ where $G_3(\omega)$ is the transfer function of the filters 24 and 27. For low data stream signal-to-noise ratios, $\tanh x \approx x$ and $$S_{\textcircled{4}} = [g_2^2 g_3^2 K_1 K_2 (d\sqrt{S}\cos\phi + n_{u3})(d\sqrt{S}\sin\phi + n_{l3})]$$
$$= g_2^2 g_3^2 K_1 K_2 \left[ \frac{S\sin 2\phi}{2} + d\sqrt{S}(\cos\phi\, n_{l3} + \sin\phi\, n_{u3}) + n_{u3} n_{l3} \right] \quad (19)$$

The noise process $n_{u3}$ is modeled exactly the same way as $n_{l3}$ and has the identical spectral density as $n_{l3}$ but is approximately independent of it. Equations (18) and (19) represent signal energy which is mutually coherent at the carrier frequency in the sidebands and arises in a hybrid loop proposed by one of the inventors, W. C. Lindsey at the 1970 International Communications Conference in San Francisco, California, and published in the IEEE Transactions on Communication Technology, Vol. Com-20, No. 1, February, 1972, pp. 53–55.

The signal appearing at point five⑤is given by $$S_{\textcircled{5}} = g_2^2 K_1 K_2 [\hat{d}_T(\hat{d}_T\sqrt{S}\cos\phi + n_{u2T})\hat{d}_T(d_T\sqrt{S}\sin\phi + n_{l2T})]$$
$$= g_2^2 K_1 K_2 \left[ \frac{S\sin 2\phi}{2} + d_T\sqrt{S}(\sin\phi\, n_{u2T} + \cos\phi\, n_{l2T}) + n_{u2T} n_{l2T} \right] \quad (20)$$

This signal also represents energy in the sidebands which is coherent in a nonlinear way at the carrier frequency.

The signal at point six⑥is given by $$S_{\textcircled{6}} = g_2 K_2 [\sqrt{S}(1-2P_E(\phi))\sin\phi + \hat{d}_T n_{l2T}] \quad (21).$$

where the phase-error is again assumed constant during a symbol time. This signal component arises in the data-aided loop described by the inventors in "Data-Aided Carrier Tracking", IEEE Trans., Vol. Com-19, No. 2, April, 1970, pp. 157–168 and in U.S. application Ser. No. 101,354, filed Dec. 24, 1970.

The signal at point seven⑦is analogous to the signal at point③with the phase error $\phi$ shifted by 90°. It is given by $$S_{\textcircled{7}} = g_1 g_2 K_2^2 (\sqrt{P_c}\cos\phi - n_{l1})(\sqrt{S}(1-2P_E(\phi))\sin\phi + \hat{d}_T n_{l2T})$$
$$= g_1 g_2 K_2^2 \left[ \sqrt{P_c S}(1-2P_E(\phi))\frac{\sin 2\phi}{2} + \sqrt{P_c}\hat{d}_T\cos\phi\, n_{l2T} - \hat{d}_T n_{l1} n_{l2T} - \sqrt{S}(1-2P_E(\phi))\sin\phi\, n_{l1} \right] \quad (22)$$

The signal at point⑧of FIG. 2 is easily found to be $$S_{\textcircled{8}} = g_1 K_1 [\sqrt{P_c}\sin\phi + n_{u1T}] \quad (23).$$

where it is again assumed that the phase-error is constant over the symbol interval. The process $n_{u1T}$ is orthogonal to the processes $n_{u1}, n_{u2}, n_{u3}, n_{l1}, n_{l2}, n_{l3}$, when the correlation time of the noise is much less than T. The signal at point⑨is given by $$S_{\textcircled{9}} = g_1 K_2 [\sqrt{P_c}\cos\phi + n_{l1T}] \quad (24).$$

when $\phi$ is constant for T seconds. The signal $S_{\textcircled{8}}$ and $S_{\textcircled{9}}$ could be added to the outputs of the upper and lower filters 12 and 17 of FIG. 1 to produce mutually coherent energy for tracking.

The instantaneous phase estimate $\hat{\theta}$ or $\theta$ which the receiver produces is given, in operator form, by $$\hat{\theta} = \frac{K_V F(p)}{p}\left[\sum_{k=1}^{7} S_{\textcircled{k}}\right] \quad (25)$$

where $K_V$ is the gain of the voltage control oscillator VCO. Since $\phi = \theta - \hat{\theta}$ we have that $$\phi = \theta - \frac{K_V}{p}F(p)\left[\sum_{k=1}^{7} S_{\textcircled{k}}\right] \quad (26)$$

This represents the stochastic integro-differential equation of loop operation. It is the general result from which all loops evolve. For instance, when the symbol rate is such that the loop phase-error is not constant (typical of command systems and low-rate-coherent telemetry systems) during a symbol time, the loop equation is given by $$\phi=\theta-\frac{K_V F(p)}{p}\left[S_{\textcircled{1}}+S_{\textcircled{2}}+S_{\textcircled{3}}+S_{\textcircled{4}}\right] \quad (27)$$

where $S_{\textcircled{1}}$, $S_{\textcircled{2}}$, $S_{\textcircled{3}}$ and $S_{\textcircled{4}}$ are found from Equations (13), (14), (15) and (18) respectively.

By applying the diffusion approximation described by R. L. Stratonovich, *Topics in the Theory of Random Noise*, Gordon and Breach, London, England, 1967, the probability density function of the phase error can be found using the general theory given by W. C. Lindsey, "Nonlinear Analysis of Generalized Tracking Systems," Proceedings of the IEEE, Vol. 57, No. 10, October, 1969, pp. 1705–1722. There it is shown that $$p(\phi)=C_0' \exp\,[U_0(\phi)]\int_{\phi}^{\phi+2\pi}\exp\,[-U_0(x)]dx;|\phi|\le\pi \quad (28)$$

where $$U_0(\phi)=-\int^{\phi}h_0(x)dx \quad (29)$$

and $C_0'$ is a normalization constant. For a first order loop $H_0(\phi)$ is the sum of the signal terms $S_{\textcircled{1}}$ through $S_{\textcircled{7}}$ normalized by $2/K_{00}$ where $K_{00}$ is the intensity coefficient of the noise to be defined shortly. For low signal-to-noise ratios (low SNR's)

$$\frac{K_{00}}{2}h_0(\phi)=[2g_1K_1\sqrt{P_c}+g_2K_2\sqrt{S}(1-2P_E(\phi))]\sin\phi$$
$$+[g_2^2K_1K_2S+g_2^2g_3^2K_1K_2S+g_1^2K_1K_2P_c]\frac{\sin 2\phi}{2}$$
$$+[g_1g_2K_1^2+g_1g_2K_2^2]\sqrt{P_cS}(1-2P_E(\phi))\frac{\sin 2\phi}{2} \quad (30)$$

while for high SNR the fourth term (involving $g_2^2g_3^2$) is replaced by the signal component $g_2g_3K_2\sqrt{S}(1-2P_E^{=}(\phi))\sin\phi$ from (18). The function $P_E^{=}(\phi)$ is approximated by Equation (17) with R replaced by $2S/N_0W_{23}$ where $W_{23}$ is the two-sided noise bandwidth of $LPF_2$ and $LPF_3$ filters in cascade. The above equation represents the stiffness of the nonlinear interactions due to the multiple loops, i.e., the commonly called loop S-curve.

The diffusion coefficient $K_{00}$ is determined from the noise and noise cross signal terms in $S_{\textcircled{1}}$ through $S_{\textcircled{7}}$. For low SNR's, the equivalent total phase noise $N_T(t,\phi)$ which effects the VCO estimate is given by $$N_T(t,\phi)\overset{\Delta}{=}g_1^2\{\sqrt{P_c}[K_2\cos\phi n_{u1}-K_1\sin\phi n_{l1}]-n_{u1}n_{l1}\}$$
$$+g_1K_1(n_{u1}+n_{u1T})$$
$$+g_1g_2K_1^2[\sqrt{P_c}\sin\phi\hat{d}_Tn_{u2T}$$
$$+\sqrt{S}(1-2P_E(\phi))\cos\phi n_{u1}+\hat{d}_Tn_{u1}n_{u2T}]$$
$$+g_2^2g_3^2K_1K_2[d\sqrt{S}(\cos\phi n_{13}+\sin\phi n_{u3})+n_{u3}n_{13}]$$
$$+g_2^2K_1K_2[\hat{d}_T\sqrt{S}(n_{12T}\cos\phi+n_{u2T}\sin\phi)$$
$$+n_{u2T}n_{12T}]+g_2K_2\hat{d}_Tn_{12}$$
$$+g_1g_2K_2^2[\sqrt{P_c}\hat{d}_T\cos\phi n_{12T}-\hat{d}_Tn_{l1}n_{12T}$$
$$-\sqrt{S}(1-2P_E(\phi))\sin\phi n_{l1}] \quad (31)$$

For high SNR's the equivalent total phase noise is obtained from Equation (31) by replacing the term involving $g_2^2g_3^2$ by $g_2g_3K_2\,d\,n_{t3}$. In the diffusion approximation technique, the coefficient $K_{00}$ is characterized by $$K_{00}=\int_{-\infty}^{\infty}E[N_T(t,\phi)N_T(t+\tau,\varphi)]d\tau \quad (32)$$

We also note that approximate formulas for the moments of the mean time to first loss of synchronization, average number of slips per unit time, etc., can be found by applying the general theory given in W. C. Lindsey, "Nonlinear Analysis of Generalized Tracking Systems," Proceedings of the IEEE, Vol. 57, No. 10, October, 1969, pp. 1705–1722.

Some particularly interesting cases of the generic tracking loop will now be discussed. As noted hereinbefore, a data-aided loop is obtained by removing all terms from the sum of Equation (26) except $S_{\textcircled{1}}$ and $S_{\textcircled{6}}$, i.e., $$\phi=\theta-\frac{K_V}{p}F(p)[g_1K_1\sqrt{P_c}\sin\phi$$
$$+g_2K_2\sqrt{S}(1-2P_E(\phi))\sin\phi+g_1K_1n_{u1}+g_2K_2\hat{d}_Tn_{12T}] \quad (33)$$

The mechanization is achieved by making the gain in all other unused channels zero, e.g., omitting all other channels. In practice, the filter 12 can also be omitted in the mechanization since the loop filter 14 will serve the same low-pass filtering purpose.

A slight generalization of the data-aided loop is obtained by adding at the summing junction 13 the signal $S_{\textcircled{8}}$ of FIG. 2. The loop equation of operation then becomes $$\phi=\theta-\frac{K_VF(p)}{p}\Big[2g_1K_1\sqrt{P_c}\sin\phi$$
$$+g_2K_2\sqrt{S}(1-2P_E(\phi)\sin\phi+g_1K_1(n_{u1}n_{u1T})+g_2K_2\hat{d}_Tn_{12T}\Big] \quad (34)$$

Figure 4:
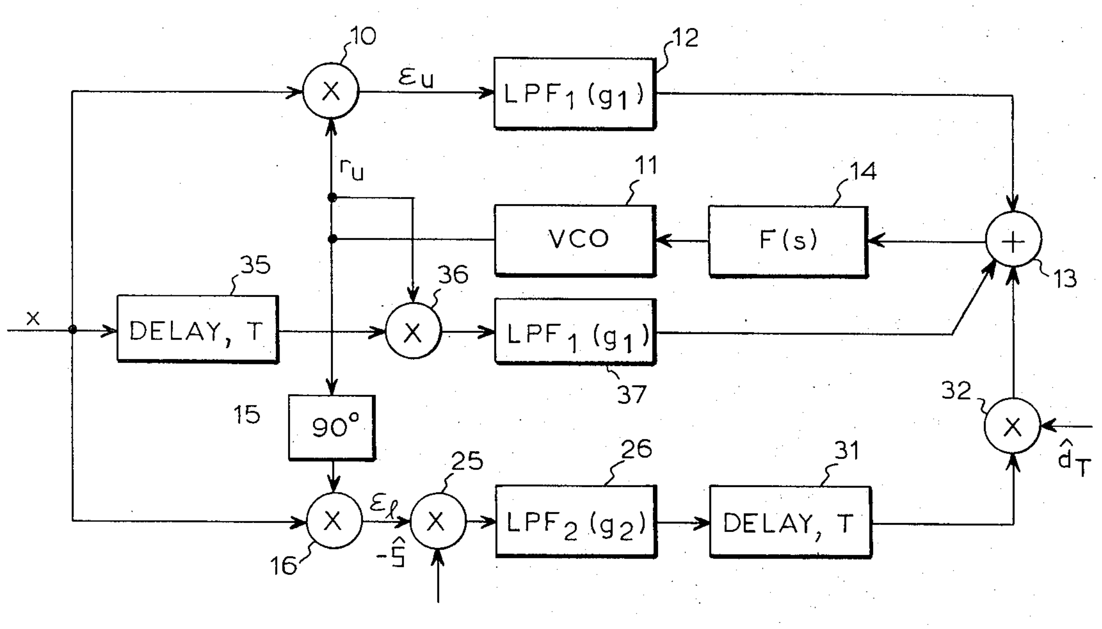
FIG. 4 illustrates a particular case of the generic tracking loop, namely a modified data-aided tracking loop.

The mechanization of this modified data-aided loop is illustrated in FIG. 4.

The hybrid loop referred to hereinbefore is obtained by removing all terms from the sum of Equation (26) except ② and ④. For example, for low SNR's $$\phi=\theta-\frac{K_VF(p)}{p}\Big[g_1K_1\sqrt{P_c}\sin\phi+g_2g_3^2K_1K_2\Big\{\frac{S\sin 2\phi}{2}$$
$$+d\sqrt{S}[\cos\phi n_{13}+\sin\phi n_{u3}]+n_{u3}n_{13}\Big\}+g_1K_1n_{u1}\Big] \quad (35)$$

Figure 5:
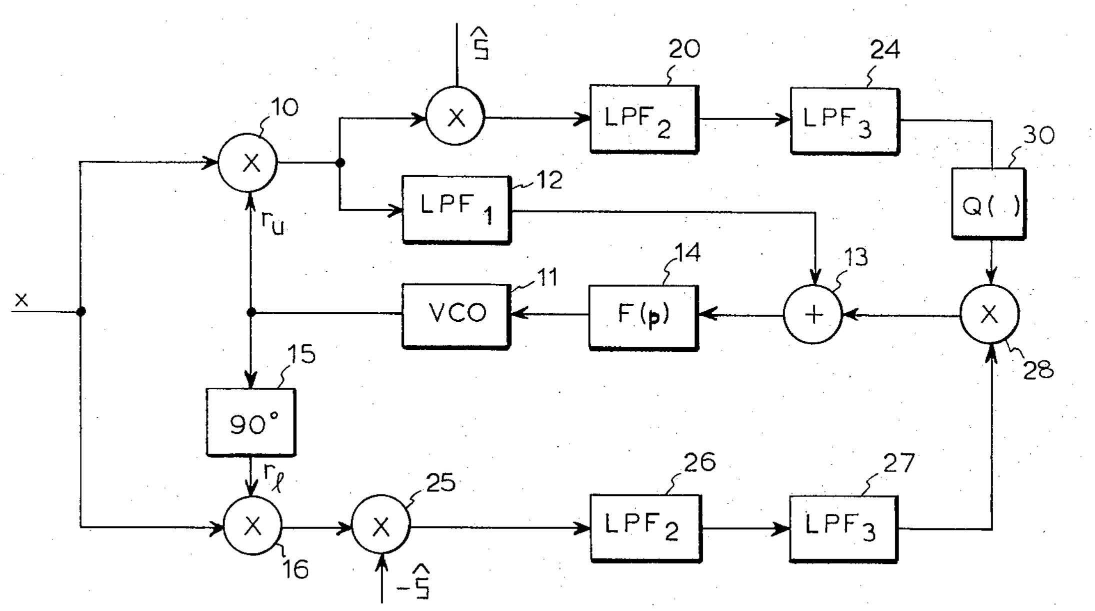
FIG. 5 illustrates another particular case of the generic tracking loop, namely a modified hybrid loop.

Mechanization is illustrated in FIG. 5. The operator Q( ) is simply a multiplication by unity for low SNR's and may be omitted. For high SNR's, the operator would be mechanized as a hard limiter, as noted hereinbefore. The subcarrier estimates $\hat{S}$ and $-\hat{S}$ in FIG. 5 and the low-pass filters can be omitted in the receiver structure at the expense of additional noise. Such loops are of interest in command, low-rate coherent telemetry systems and military applications where the phase-error is not constant over the symbol interval.

Combinations of the data-aided and hybrid loops are also of interest. When the phase-error is constant during a symbol interval one should take advantage of the independence of the noise which is forcing the loop as well as the power in the sidebands. In this case the loop equation is obtained from Equation (26) by removing all terms from the sum except the even ones and adding $S_{\textcircled{8}}$. The loop equation is then given by $$\phi=\theta-K_VF(p)/p\,[S_{\textcircled{2}}+S_{\textcircled{4}}+S_{\textcircled{6}}+S_{\textcircled{8}}] \quad (36)$$

Figure 6:
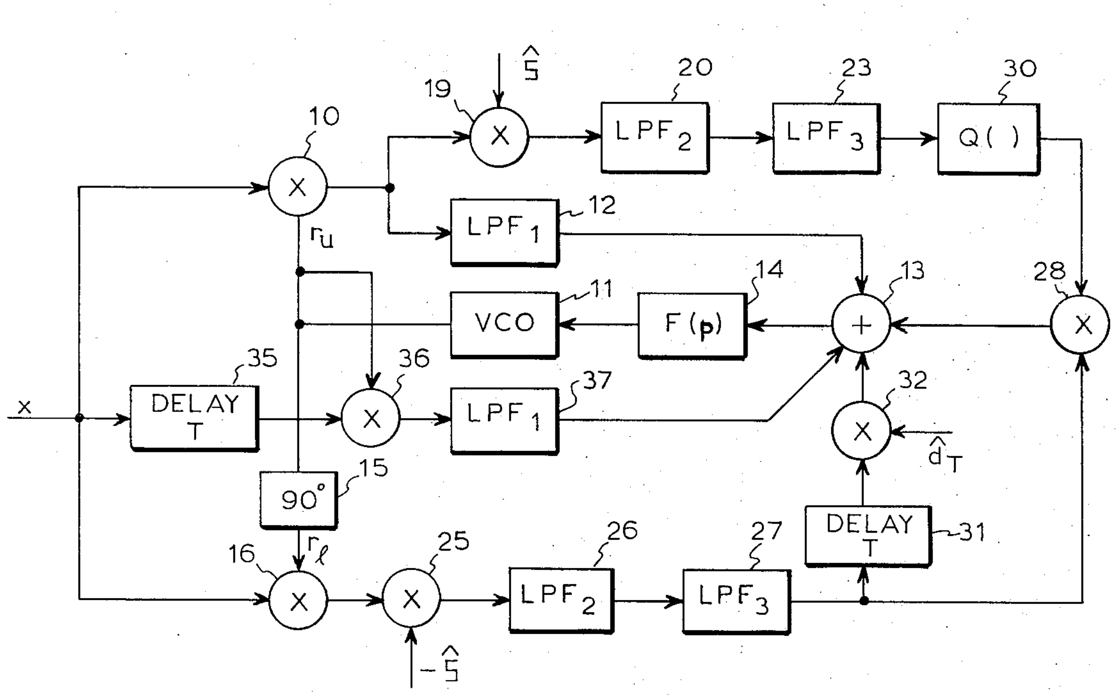
FIG. 6 illustrates the combined data-aided loop of FIG. 4 with the hybrid loop of FIG. 5.

It is a simple matter to obtain the probability density function of the phase-error since one must simply combine the theory given in the references cited hereinbefore in connection with the hybrid loop and the data-aided loop with the theory given by the inventors in "The Performance of Suppressed Carrier Tracking Loops in the Presence of Frequency Detuning" and use the general theory developed by one of the inventors, W. C. Lindsey in "Nonlinear Analysis of Generalized Tracking Systems". A typical mechanization of the loop is illustrated in FIG. 6. As in other cases, the operator Q( ) is simply a multiplication by one for low SNR and is best mechanized by simply omitting it, and is sgn $x$ for high SNR mechanized by a hard limiter.

Suppressed carrier loops are of interest in practice at both the carrier and subcarrier level. Various mechanizations will now be described which render improvement in such loops when the phase-error is constant over the symbol interval. When the carrier is suppressed, $m = P_c = 0$. For this case, the loop Equation (26) reduces to $$\phi = \theta - K_V F(p)/p\ [S_{\textcircled{4}} + S_{\textcircled{6}}] \quad (37).$$

and the probability density function of the phase-error is easily obtained as before. Moments of the means time to first slip and the average number of slips per unit of time can be obtained by using the general theory given in the last reference cited. Various mechanizations of the loop are possible using the circuit of FIG. 3 to produce $\hat{d}(t-T)$

What is claimed is:

1. In a receiver channel for a time varying signal, x, characterized by $x = \sqrt{2P_c} \sin \Phi + \sqrt{2S} \times \cos \Phi + n_i$, where $\Phi = \omega_o t + \theta$, $\theta$ characterizes modulation due to receiver motion or the randomness of said channel, $n_i$ is a narrowband, "white" Gaussian noise process of double-sided bandwidth $W_i$ Hz and single-sided spectral density $N_o$ watts/Hz, $P_c = m^2 P$ represents power at the carrier frequency, $S = (1-m^2)P$ represents the power remaining in the modulation sidebands, $m$ denotes the modulation factor, $X = \varsigma d$ is a biphase modulated subcarrier, and $\varsigma$ and $d$ represent the data subcarrier and the data waveforms, respectively, which are assumed to be square waveforms, a tracking loop comprised of a voltage controlled oscillator for generating a time varying reference signal $r_u = \sqrt{2}K_1 \cos\Phi$ at an output terminal thereof in response to a feedback signal at an input terminal, where said feedback signal is the sum of one or more feedback signals $S_{\textcircled{1}}$ through $S_{\textcircled{7}}$ at respective points ① through ⑦ of said loop excepting a signal at point ①, ② or ⑥ by itself, or a signal at point ④ by itself for low data stream signal-to-noise ratios, and excepting sums of only signals $S_{\textcircled{1}}$ and $S_{\textcircled{6}}$ or only signals $S_{\textcircled{2}}$ and $S_{\textcircled{4}}$ for low data stream signal-to-noise ratios, said loop including means responsive to said received signal and said reference signal for generating said one or more feedback signals, where said feedback signals are characterized by the following equations, neglecting double frequency terms:

$$\epsilon_u = K_1 [\sqrt{P_c} \sin\phi + \sqrt{S} \times \cos\phi + n_u(t,\phi)]$$
$$\epsilon_l = K_2 [\sqrt{P_c} \cos\phi - \sqrt{S} \times \sin\phi\ n_l(t,\phi)]$$

where $\epsilon_u$ is the output of an inphase phase detector and $\epsilon_l$ is the output of a quadrature phase detector using the reference signal $r_u$ for inphase phase detection of said signal $x$ and a 90° phase shifted reference signal characterized by $r_l = \sqrt{2} K_2 \sin \Phi$ for quadrature phase detection of said signal $x$ and $X = \varsigma d$ is a biphase modulated subcarrier, $\varsigma$ and $d$ represent the data subcarrier and the data waveforms, respectively, and $\hat{\varsigma}$ and $\hat{d}$ represent the receiver's estimates of the data subcarrier and the data waveforms, respectively;

$$S_{\textcircled{1}} = g_1^2 \left\{ \frac{K_1 K_2 P_c \sin 2\phi}{2} + \sqrt{P_c}[K_2 \cos \phi n_{u1} - K_1 \sin \phi n_{l1}] - n_{u1} n_{l1} \right\}$$

where $n_{u1}$ and $n_{l1}$ are respectively the noise processes which emerge after separate lowpass filtering of inphase and quadrature phase detections of said signal $x$ and the signal $S_{\textcircled{1}}$ is the product the lowpass filtered inphase and quadrature phase detections of said signal $x$, and $g_1$ is the d-c gain of said lowpass filtering processes;

$$S_{\textcircled{2}} = g_1 K_1 [\sqrt{P_c} \sin\phi + n_{u1}]$$

where the signal $S_{\textcircled{2}}$ is said inphase phase detection of said signal $x$, neglecting double frequency terms, and represents dynamic phase error;

$$S_{\textcircled{3}} = g_1 g_2 K_1^2 \left[ d_T \hat{d}_T \sqrt{SP_c} \frac{\sin 2\phi}{2} + \sqrt{P_c}\hat{d}_T \sin \phi n_{u2T} + \sqrt{S} d_T \hat{d}_T \cos \phi n_{u1} + \hat{d}_{Tu1} n_{u2T} \right]$$

where said estimate $\hat{\varsigma}$ of the data subcarrier is a squarewave and it is assumed that $\hat{\varsigma} = \varsigma$, and the inphase phase detected data subcarrier of said signal $\epsilon_u$ is filtered by a lowpass filter of gain $g_2$ to provide a signal represented by $g_2 K_1 [d \sqrt{S} \cos \phi + n_{u2}]$ which, upon being delayed for one data symbol period T and multiplied by said data waveform estimate $\hat{d}_t$ delayed one data symbol period T is multiplied by said signal $S_{\textcircled{2}}$ to yield said signal $S_{\textcircled{3}}$ at point ③;

$$S_{\textcircled{4}} = g_2 g_3 K_2 [\sqrt{S}\, d\, \hat{d} \sin\phi + \hat{d}\, n_{l3}]$$

where $\hat{d}$ represents a data stream estimate for high data stream signal-to-noise ratios produced by said bandpass filter of gain $g_2$ in cascade with a bandpass filter of gain $g_3$ cascaded with a generator of a function $Q(x) \approx$ sgn $x$ implemented as a hard limiter for the inphase phase detected and subcarrier detected signal $x$, and $n_{l3}$ is the noise process, which is approximately low-pass Gaussian for the quadrature phase detected and subcarrier phase detected signal of said input signal $x$, and said signal $S_{\textcircled{4}}$ is produced by multiplying the output of said function generator by the quadrature phase detected and subcarrier phase detected signal of said input signal $x$, and said signal $S_{\textcircled{4}}$ is produced for low data stream signal-to-noise ratios in the same manner, but with said generator of a function $Q(x) \approx x$, where $x << 1$, in which case said signal $S_{\textcircled{4}}$ is given by the following equation:

$$S_{\textcircled{4}} = [g_2^2 g_3^2 K_1 K_2 (d\sqrt{S} \cos \phi + n_{u3})(d\sqrt{S} \sin \phi + n_{l3})]$$
$$= g_2^2 g_3^2 K_1 K_2 \left[ \frac{S \sin 2\phi}{2} + d\sqrt{S}\ (\cos \phi n_{l3} + \sin \phi n_{u3}) + n_{u3} n_{l3} \right]$$

and said signals $S_{\textcircled{5}}$, $S_{\textcircled{6}}$ and $S_{\textcircled{7}}$ at points ⑤, ⑥ and ⑦ are given by $$S_{\textcircled{5}} = g_2^2 K_1 K_2 [\hat{d}_T(\hat{d}_T \sqrt{S} \cos \phi + n_{u2T}) \hat{d}_T (d_T \sqrt{S} \sin \phi + n_{l2T})]$$
$$= g_2^2 K_1 K_2 \left[ \frac{S \sin 2\phi}{2} + d_T \sqrt{S}\ (\sin \phi n_{u2T} + \cos \phi n_{l2T}) + n_{u2T} n_{l2T} \right]$$

$$S_{\textcircled{6}}=g_2K^2[\sqrt{S}(1-2P_E(\phi))\sin\phi+\hat{d}_T n_{12T}]$$

$$S_{\textcircled{7}}=g_1g_2K_2^2(\sqrt{P_c}\cos\phi-n_{11})(\sqrt{S}(1-2P_E(\phi))\sin\phi+\hat{d}_T n_{12T})$$

$$=g_1g_2K_2^2\Big[\sqrt{P_cS}(1-2P_E(\phi))\frac{\sin 2\phi}{2}+\sqrt{P_c}\hat{d}_T\cos\phi n_{12T}-\hat{d}_T n_{11}n_{12T}-\sqrt{S}(1-2P_E(\phi))\sin\phi n_{11}\Big]$$

where the signal at point ⑦ is analogous to the signal at point ③ with phase error $\phi$ shifted by 90°.

2. The combination of claim 1 including means responsive to said received signal delayed one symbol period T, said reference signal and said reference signal shifted 90° for producing one or both of respective delayed inphase and quadrature phase detected and filtered signals $S_{\textcircled{8}}$ and $S_{\textcircled{9}}$ at respective points ⑧ and ⑨ given by $$S_{\textcircled{8}}=g_1K_1[\sqrt{P_c}\sin\phi+n_{u1T}]$$
$$S_{\textcircled{9}}=g_1K_2[\sqrt{P_c}\cos\phi+n_{l1T}]$$

where it is assumed that the phase-error $\phi$ is constant over the symbol period T, and the noise process $n_{ulT}$ is orthogonal to the noise processes $n_{u1}$, $n_{u2}$, $n_{u3}$, $n_{l1}$, $n_{l2}$ and $n_{l3}$ when the correlation time of the noise is much less than T, and said signals at points ⑧ and ⑨ produced are added to signals produced as corresponding inphase and quadrature phase detected and filtered signals of said undelayed input signal $x$, where the inphase phase detected and filtered signal is said signal $S_{\textcircled{2}}$ at point ②

3. In a receiver channel for a time varying signal $x$ characterized by $x = \sqrt{2P_c}\sin\Phi + 2\sqrt{S}\times\cos\Phi + n_i$, where $X = ⎍d$ is a biphase modulated subcarrier, ⎍ and $d$ represent the data subcarrier and the data waveforms, respectively, which are assumed to be square waveforms, $\hat{⎍}$ and $\hat{d}$ represent the receiver's estimates of the data subcarrier and the data waveforms, respectively, and where $P_c = m^2P$ represents power at the carrier frequency, $S = (1-m^2)P$ represents the power remaining in the modulation sidebands and $m$ denotes the modulation, a generic tracking loop, provided to exploit the principle of nonlinear coherence comprised of:

a voltage controlled oscillator for generating a time varying reference signal $r_u = \sqrt{2}K_1\cos\hat{\Phi}$, where $\hat{\Phi}$ is the time varying loop estimate of $\Phi$ and $\Phi = \omega_o t + \theta$, where $\theta$ characterizes modulation due to receiver motion or the randomness of said channel;

a summing junction and a smoothing filter coupling the junction to a control terminal of the oscillator;

a 90° phase-shift network for providing a quadrature phase reference signal $r_l = \sqrt{2}K_2\sin\hat{\Phi}$;

two multipliers responsive to the receiver signal and the signals $r_u$ and $r_l$ for producing quadrature phase error signals $\epsilon_u = xr_u$ and $\epsilon_l = xr_l$;

a first low-pass filter of a particular bandwidth and gain coupling the signal $r_u$ to a point ② connected to said summing junction;

a first multiplier having one terminal connected to receive the output of said first filter and the output of a second low-pass filter of a particular bandwidth and gain to provide a product signal at a point ① connected to said summing junction;

means for demodulating the phase error signal $\epsilon_u$ by a phase estimate of a reference square-wave subcarrier and a third low-pass filter of a particular bandwidth and gain for filtering the demodulated signal;

means for delaying this subcarrier demodulated and filtered signal a time T equal to a data symbol period;

means for multiplying this first delayed signal by $\hat{d}(t-T)$ where $\hat{d}(t)$ is the time varying estimate of the data waveform;

means for multiplying the output of this last multiplying means by the output of the first filter to produce a third feedback signal at point ③ connected to the summing junction;

means for demodulating the phase error signal $\epsilon_l$ by a phase quadrature estimate of the reference square-wave subcarrier and a fourth low-pass filter of a particular bandwidth and gain for filtering the phase quadrature demodulated signal;

means for delaying this subcarrier phase quadrature demodulated and filtered signal a time T;

means for multiplying this second delayed signal by $\hat{d}(t-T)$ to produce another signal at a point ⑥ connected to the summing junction;

means for multiplying the output of this last multiplying means by the product of the multiplying means of the first delayed signal and $\hat{d}(t-T)$ to produce yet another signal at a point ⑤ connected to the summing junction;

means for multiplying the output of the second low-pass filter and the output of the penultimate multiplying means to produce a signal at a point ⑦ connected to the summing means;

fifth and sixth low-pass filters of particular bandwidth and gain connected to the outputs of respective third and fourth filters; and a multiplier having its output terminal connected to a point ④ one input terminal connected to the output of said sixth filter and another input terminal connected to the output of said fifth filter by an operator which provides a function approximately equal to tanh $x$, where $x$ is the output of said fifth filter;

wherein the gain of said filters may be selectively set to zero to effectively remove signals at points ① through ⑦ to provide a desired combination of feedback signals to said summing junction.

4. The combination of claim 2 adapted to exploit sideband power in applications where phase error can be assumed to be constant over several data symbol intervals, by providing additional feedback signals at points ⑧ and ⑨ using a delay means of a delay time T coupling said receiver input signal $x$ to two additional multipliers, one receiving the reference signals $r_u$ and the other receiving the reference $r_l$ for inphase and quadrature phase detection of the delayed input signal, and using separate low-pass filters of particular bandwidth and gain coupling the outputs of said additional multipliers to said points ⑧ and ⑨, means for connecting the filtered output of the inphase error signal thus produced at point ⑧ to said signal $S_{\textcircled{2}}$ at point ②, and means for connecting the filtered output of the quadrature phase error signal thus produced at point ⑨, wherein the gain of said separate low-pass filters may be selectively set to zero to effectively remove signals at points ⑧ and ⑨ from said tracking loop.

* * * * *